United States Patent
Huang

(10) Patent No.: US 9,331,323 B2
(45) Date of Patent: May 3, 2016

(54) CROSS-LINKED MULTILAYER POROUS POLYMER MEMBRANE BATTERY SEPARATORS

(71) Applicant: GM GLOBAL TECHNOLOGY OPERATIONS LLC, Detroit, MI (US)

(72) Inventor: Xiaosong Huang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 203 days.

(21) Appl. No.: 13/971,900

(22) Filed: Aug. 21, 2013

(65) Prior Publication Data

US 2015/0056492 A1 Feb. 26, 2015

(51) Int. Cl.
  *H01M 2/16* (2006.01)
  *H01M 2/14* (2006.01)
  *H01M 10/0525* (2010.01)

(52) U.S. Cl.
  CPC ............ *H01M 2/1686* (2013.01); *H01M 2/145* (2013.01); *H01M 2/1653* (2013.01); *H01M 10/0525* (2013.01)

(58) Field of Classification Search
  CPC . H01M 2/1686; H01M 2/145; H01M 2/1653; H01M 10/0525
  See application file for complete search history.

(56) References Cited

U.S. PATENT DOCUMENTS

| | | | |
|---|---|---|---|
| 5,324,779 A * | 6/1994 | Jarrin et al. | ............ 525/57 |
| 8,455,140 B1 | 6/2013 | Huang et al. | |
| 8,460,829 B1 | 6/2013 | Huang et al. | |
| 8,470,468 B2 | 6/2013 | Xiao et al. | |
| 8,470,898 B2 | 6/2013 | Huang | |
| 2010/0003591 A1 * | 1/2010 | Takita et al. | ............ 429/145 |
| 2012/0156568 A1 | 6/2012 | Kia et al. | |
| 2012/0156569 A1 | 6/2012 | Kia et al. | |
| 2012/0231321 A1 | 9/2012 | Huang et al. | |
| 2012/0308872 A1 | 12/2012 | Huang | |
| 2013/0131200 A1 | 5/2013 | Huang | |
| 2013/0224602 A1 | 8/2013 | Huang | |

* cited by examiner

*Primary Examiner* — Helen O Conley
(74) *Attorney, Agent, or Firm* — Reising Ethington P.C.

(57) ABSTRACT

A cross-linkable polyolefin composition (polyethylene, polypropylene or an ethylene-propylene copolymer) is coextruded with ultrahigh molecular weight polyethylene to form two-layer separator membranes, or three-layer separator membranes, for lithium-ion battery cells. In three-layer separator membranes, the cross-linkable polyolefin is formed as the outer faces of the separator for placement against facing surfaces of cell electrodes. The polymer materials initially contain plasticizer oil, which is removed from the extruded membranes, and the extruded membranes are also stretched to obtain a suitable open pore structure in the layered membranes to provide for suitable infiltration with a liquid electrolyte. The cross-linked polyolefin layer provides strength at elevated temperatures and the lower-melting, ultrahigh molecular weight polyethylene layer provides the separator membrane with a thermal shutdown capability.

7 Claims, 2 Drawing Sheets

CROSS-LINKED MULTILAYER POROUS POLYMER MEMBRANE BATTERY SEPARATORS

TECHNICAL FIELD

This disclosure pertains to two-layer and three-layer, porous polyolefin separator membranes for battery applications, especially for lithium-ion battery applications. More specifically, this disclosure pertains to the preparation of such multi-film-layer separators which comprise at least one high temperature resistant cross-linked polyolefin layer, co-extruded with a non-crosslinked polyolefin layer which provides thermal shutdown capability. The co-extruded polymer layers (separator precursor) each contain a dispersed hydrocarbon liquid (oil) plasticizer. The coextruded films are stretched and the plasticizer is extracted from the film layers to provide a suitable pore structure in the separator membrane.

BACKGROUND OF THE INVENTION

A secondary liquid-electrolyte battery generally contains at least one electrochemical cell that includes a negative electrode, a positive electrode, and a separator situated between the electrodes. The negative and positive electrodes are constructed from materials that can participate in both oxidation and reduction reactions. Such electrode materials allow an electric current to be reversibly passed between the electrodes in an external circuit, while an ionic species migrates within the cell, between the electrodes through the separator within a liquid electrolyte to electrochemically balance the external electron current flow. These concurrent electrical current and ionic current flows occur spontaneously during cell discharge. During cell discharge, oxidation occurs spontaneously at the negative electrode and reduction occurs at the positive electrode. Reverse reactions are compelled during the cell charge phase in which oxidation occurs at the positive electrode and reduction occurs at the negative electrode. The electric current generated during cell discharge may be used to power, at least in part, an electrical load, while an applied voltage from an external power source may be used to charge, or re-power, the cell once its current capacity has fallen to an undesirable level.

Lithium-ion electrochemical cells, for example, are used in many secondary, liquid-electrolyte batteries. In one example of a lithium-ion cell, the electrolyte comprises a suitable lithium compound, such as $LiPF_6$, which is dissolved in a non-aqueous organic liquid. The anode may comprise a thin layer of graphite suitably bonded to a thin metal current collector strip. Lithium is intercalated into the graphite layers during charging of the cell. And the cathode comprises a thin layer of a suitable lithium compound, also bonded to a thin metal current collector strip, for receiving lithium ions transported from the anode through the electrolyte to the cathode during discharge of the cell. A thin porous polymer separator membrane is placed between the anode and cathode layers.

The separator facilitates operation of the electrochemical battery cell by providing a porous and electrically-insulative mechanical support barrier between the two electrodes. The separator, in general, has a porosity sufficient to contain the liquid electrolyte—which can transport the ionic species between the electrodes—yet is thermally, chemically, and mechanically stable enough to separate the closely spaced, opposing negative and positive electrodes over the course of many discharge/charge cell cycles so that a short-circuit is prevented. A wide variety of materials, either alone or in combination with one another, have been either utilized or investigated for construction of the separator with the goal of imparting long term operational reliability to the separator within different working environments. The most commonly used separators today are made from a single flat thermoplastic polyolefin sheet membrane or a laminate of several flat polyolefin sheet membranes. The particular thermoplastic polyolefins usually employed are those derived from simple low-carbon-number olefins, such as polypropylene and polyethylene.

The electrochemical battery cell, in order to interact with the electrical load and the external power source, is configured for connection to an external circuit that provides an electric current path between the negative and positive electrodes external to the electrochemical cell. Each of the negative and positive electrodes, for instance, is typically associated with a metallic current collector that helps distribute the electric current passing through the external circuit to and from all electrochemically active regions of the electrodes. A connection feature such as a connector tab may be included on each of the metallic current collectors. The connection feature may protrude away from the electrochemical battery cell to operatively establish an electrical connection with the external circuit. This is usually accomplished by connecting the protruding connection features associated with the negative and positive electrodes to negative and positive terminals, respectively, in either a serial or parallel relationship with the connection features associated with other electrochemical battery cells. Negative and positive terminals may not be needed, however, if the secondary liquid-electrolyte battery includes only one electrochemical battery cell.

In automotive vehicle applications, for example, many lithium-ion electrochemical cells may be interconnected in series and parallel electrical circuit connections to form a secondary battery that is capable of delivering substantial electrical power at a relatively high voltage to a traction motor for driving the vehicle. The battery is subject to ambient heating and cooling in the vehicle environment. And the thin electrode and separator elements of each cell also experience heating due to significant power load demand and are subjected to many repeated discharge and re-charge cycles. The vehicle has a cooling system for managing the battery temperature within a specified operating temperature range. But the vehicle battery may experience significant heating under abusive conditions in which the battery may be physically damaged. Thin polyolefin separators, for example, may be exposed to elevated temperatures which soften them and reduce their effectiveness in maintaining suitable separation of closely spaced anode and cathode layers. The shrinkage experienced by a polyolefin separator at an elevated temperature can also increase the risk of battery electrical shorting. There is a need to consider other materials which can be formed into strong, temperature resistant, and electrochemically effective separator membranes or thin layers.

SUMMARY OF THE INVENTION

A micro-porous, two-layer or three-layer polyolefin-containing separator membrane is disclosed. Each polyolefin composition typically consists mostly of a polyethylene or a polypropylene or a copolymer of ethylene and propylene. The two-layer separator comprises a thin cross-linked polyolefin layer bonded to a thin, co-extensive, non-crosslinked, polyolefin layer. The three-layer separator comprises outer layers (face layers) of a crosslinked polyolefin enclosing (sandwiching) a co-extensive non-crosslinked polyolefin layer. Examples of suitable, commercially available, cross-linkable polyolefins include Polidiemme® G/450 (polyolefin elastomer) or Polidan® EC/51 (polyethylene). These polyolefin polymers are grafted with silane groups such that they can be cross-linked by reaction with water (often moisture in air) at an ambient temperature in the presence of a suitable catalyst. An ultrahigh molecular weight polyethylene (UHMWPE) may be used as the non-crosslinked polyolefin. The cross-linkable polyolefin may also be mixed with up to 100% by weight of a polyolefin-based elastomer (up to 50% of the mixture), such as an ethylene-vinyl acetate elastomer or a poly(acrylic acid)-grafted polyethylene. These polymer blends may improve the compatibility of the surface of the cross-linked polyolefin separator layer with the closely contacting electrode material layers of the lithium-ion cell.

A co-extrusion method of making the porous, two-layer or three-layer separator membranes is also disclosed. The cross-linkable polyolefin-based material (with its cross-linking catalyst) and the UHMWPE are selected for the formation of the separators. Prior to extrusion, each polymer portion is heated and mixed with a mineral oil or paraffin oil (light hydrocarbon oil) plasticizer, such that the oil makes-up 10% to 80% by weight of the plasticizer oil-polyolefin mixtures. Each polyolefin polymer portion may be prepared as a separate homogenous melt for co-extrusion to form a two-layer or three layer separator membrane structure. The homogenous portions are heated and advanced through flow passages in an extrusion machine and forced through a sheet-die into a gel-like, two or three layer film, typically with a generally uniform thickness up to about five hundred micrometers. The thickness of the non-crosslinkable UHMWPE layer may be 20% to 80% of the overall thickness in both the two-layer and three-layer separator structures. The extruded, layered-film is produced with an area such that suitable separator shapes may be cut from the co-extruded product. A volatile solvent (such as methylene chloride) is used to extract the hydrocarbon plasticizer oil from the film layers. The film is stretched to adjust the pore size or density of the film, and to improve the mechanical performance of the structure in the stretched direction. The stretching step may be performed before or after the extraction of the oil from the polymer films. The cross-linkable polyolefin layer or layers of the separator film are then cross-linked by reaction with liquid water or water vapor at a suitable temperature.

The finished layered-separator typically has a uniform thickness in the range of about ten to about fifty micrometers. In the two-layer structure the thickness of the cross-linked polyolefin is about 20-80% of the overall thickness of the separator membrane. In the three-layer separator membrane, the thicknesses of the two outer crosslinked polyolefin layers are about equal and together make up about 20 to 80% of the total thickness of the three-layer membrane. Suitably, the crosslinked polyolefin is a water-curable, silane-grafted polyethylene or a water-curable, silane-grafted polypropylene, or a water-curable, silane-grafted copolymer of ethylene and propylene. The porous cross-linked polyolefin layer(s) provide the separator membrane with strength and resistance to shrinkage (especially at temperatures in the range of about 120° to 170° C.) and melting when the battery temperature increased. And the lower-melting, porous, non-crosslinked polyolefin layer provides the separator membrane with thermal shutdown capability by fusing and plugging the pores of the separator to minimize further cell electrochemical activity in an overly active or physically damaged battery that is overheating.

Other objects and advantages of the invention disclosure will be apparent from a description of preferred embodiments of the invention which follow in this specification.

DESCRIPTION OF PREFERRED EMBODIMENTS

Figure 1:
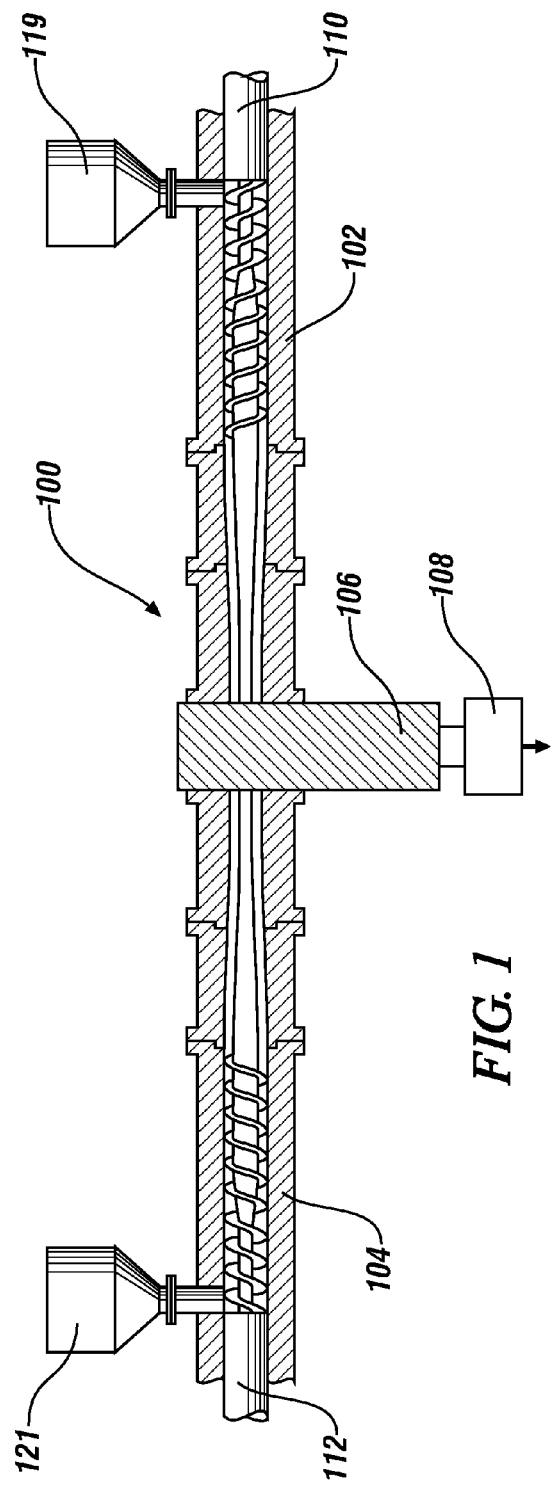
FIG. 1 is a schematic view, partly in cross-section, of a machine, for co-extrusion of a two-layer or three-layer, polyolefin-based separator membrane in accordance with an embodiment of this disclosure.

Thermoplastic polyethylene and polypropylene materials have been widely used as separator membranes in lithium-ion electrochemical cells because these thermoplastic materials are chemically and electrochemically very stable, inexpensive, and easy to process. But as the batteries have become larger and found use in automotive vehicles to power traction motors, improving battery abuse tolerance (including physical damage) has become more critical. This has led to efforts to develop thermally stable separator membranes. In practices of this invention, use is made of cross-linkable polyethylene polymers, and/or cross-linkable polypropylene polymers, and/or cross-linkable copolymers of ethylene and propylene to increase the temperature resistance of the thin layer separators used in higher power battery applications. While it is recognized that such cross-linkable polymers may continue to work well at higher cell operating temperatures, consideration must also be given as to how they can be quickly and efficiently formed into suitable porous separator shapes. And with the possible exposure to battery damage or other abuse of the battery, means must be provided in the separators to shutdown at least some cells of the battery in the event the higher capacity battery becomes over heated.

In this specification references to cross-linkable polyolefins is directed to cross-linkable polyethylene and polypropylene polymers and their copolymers. And while there are different chemical approaches to enable cross-linking of polyethylene and polypropylene, it is preferred to use such polyolefins that are cross-linkable by reaction with water or moisture. In general, silane-grafted polyolefins are preferred for use in embodiments of this invention. As described above in this specification, examples of suitable, commercially available, silane-grafted, cross-linkable polyolefins include Polidiemme® G/450 (a polyolefin copolymer, Solway) or Polidan® EC/51 (polyethylene, Solway). In practices of this invention these materials (in uncross-linked form) are available. They are used with a commercial catalyst which may be mixed with the base silane-grafted polymer, and the polymer-catalyst mixture melted and extruded into a useful shape before the shaped olefin polymer is exposed to water vapor at an ambient temperature and thereby converted to its temperature resistant cross-linked form. Such cross-linked polyolefins typically display a linear shrinkage amount of less than about 5% when heated at a temperature of 120° C. for one hour. Such cross-linkable polyolefins are used in forming the thin, porous two-layer and three-layer separator membrane structures of this invention.

In some embodiments of the invention it is preferred to mix the polyolefin, in its cross-linkable form, with an ethylene-vinyl acetate copolymer elastomer or with a poly(acrylic acid) grafted polyethylene elastomer such that the added polymer constitutes up to about 100% by weigh of the cross-linkable polyolefin or up to about 50% of the mixture. The mixture may be formed preparatory to the extrusion of the cross-linkable polyolefin into the multilayer separator membrane structure. In some lithium-ion cell materials the use of the additive polymer with the ultimately cross-linked polyolefin renders the polyolefin surface of the separator membrane more compatible with a touching electrode material for better lithium ion transport through the interface between the separator and the electrode.

In accordance with practices of this invention, ultrahigh molecular weight polyethylene (UHMWPE) is used in combinations with the cross-linked polyolefin. UHMWPE is commercially available. The material has long molecular chains (unbranched and un-cross linked), typically containing 100,000 to 250,000 repeating ethylene units with a molecular mass between two and six million units (u). UHMWPE has a melting point in the range of 130-136° C. In the two-layer and three-layer separator structures of this invention, the UHMWPE complements the functions of the layer or layers of cross-linked polyolefin. The strength and porosity of the UHMWPE layer contribute to the function of the separator membrane. And an important function of the UHMWPE layer is that it can serve to inherently and automatically melt or fuse, and to close separator pores to shutdown ion-transport through the separator structure of at least some cells of a battery in the event it becomes overly active and overheated.

In accordance with practices of this invention, suitable compositions and proportions of cross-linkable polyolefin (with water cross-linking catalyst) and UHMWPE are selected for co-extrusion into a two-layer or three-layer separator membrane structure for lithium-ion battery cells. In many applications, the high-power capability battery will require many interconnected cells, each requiring a separator for physically separating the opposing positive and negative electrodes. The cross-linkable polyolefin and UHMWPE are to be co-extruded into thin separator precursor sheets from which porous separator membranes can be prepared. Many separators of different sizes may be cut or otherwise obtained from the prepared separator membranes.

It is necessary to form a suitable pore structure in each layer of the co-extruded membrane material. It is preferred that this be done using a "wet method" in which a liquid light hydrocarbon oil plasticizer (e.g., mineral oil or paraffin oil) is mixed into each polymer material prior to extrusion of the polymers into a multi-layer separator membrane structure. A suitable quantity or proportion of the plasticizer is mixed with each polymer prior to extrusion for suitable pore formation at a later stage of the process. As each polymer mass is heated to its extrusion temperature it melts and readily mixes with and absorbs the oil. In the solidified, co-extruded film, the oil is in the form of tiny separated droplets that are dispersed in each polymer layer of the film. The droplets act as pore seeds. The oil droplets are extracted from the extruded polymer layers and the extruded multi-layer polymer film is stretched. The order in which the oil extraction step and the stretching step are performed may be decided for each separator membrane material and structure. The stretching step enlarges the pore size and the interconnections between the open pore structure in each polyolefin layer. Typically a separator membrane structure has a volume of open interconnected sub-micron-size pores that have a combined volume of about 20% to about 70% of the outline volume (or superficial external volume) of the membrane's three-dimensional shape or structure. A preferred pore volume may be equal to about 30% to about 60% of the three-dimensional outline volume of the membrane. This porosity is achieved by the use of the hydrocarbon plasticizer oil, substantially dissolved in the polymer melt mix, the subsequent extraction of the oil from each layer of the coextruded and re-solidified polymer film layers, and the physical stretching of the extruded film. The goal is to obtain a generally uniform dispersion of interconnected micro-pores providing a pathway for transport of lithium ions through the separator, from one side to the other, when the separator membrane is infiltrated with a lithium-ion containing electrolyte in a lithium-ion electrochemical cell.

Figure 2:
FIG. 2 is an enlarged, schematic, oblique view, partly broken-away and in cross-section of a three-layer polyolefin-based separator for a lithium-ion battery cell. The open micropores are illustrated schematically in the speckled illustration of each of the three polymer layers.

FIG. 1 provides a schematic illustration, partly broken away and partly in cross-section, depicting a suitable apparatus and method for co-extrusion of the polyolefins as they are melted and uniformly mixed with a suitable compatible and extractible organic mineral oil. Co-extrusion machine 100 comprises two opposing, co-axially aligned tubular polymer feed channels 102, 104 for delivering melted plasticized-polymer compositions to a central, transverse, two or three channel flow passage 106 for delivering separate flow streams of a cross-linkable polyethylene or polypropylene or ethylene-propylene co-polymer and a UHMWPE to a multichannel die 108 for co-extrusion of these polyolefin materials into a two-layer or three-layer film membrane which is a precursor of the separator membrane of this invention. The directional arrow (→) in FIG. 1 indicates the flow of a suitably cooled, handle able, layered membrane from the extrusion machine. FIG. 2 is an enlarged fragmentary view of a three-layer separator membrane structure 18. In the three-layer separator membrane 18 illustrated in FIG. 2, outside face layers 19 are ultimately formed of a cross-linked polyolefin with micro-pores and the central or internal layer 21 is formed of a ultrahigh molecular weight polyethylene with micro-pores.

Referring again to FIG. 1, particles of cross-linkable polyethylene or cross-linkable polypropylene, intimately mixed with a light hydrocarbon oil plasticizer, is added to feed hopper 119. In general, the plasticizer oil and cross-linkable polyolefin solids can be mixed as liquids and re-solidified before they are added to feed hopper 119. They may also be mixed in the extruder. In a similar manner, particles of UHMWPE, pre-mixed with plasticizer oil, are added to feed hopper 121. The respective polyolefin particles in their feed hoppers 119, 121 are continually fed into feed channels 102, 104. Feed channels 102, 104 are suitably heated by electrical resistance heating (not shown in FIG. 1) or the like. Located in feed channels 102, 104 are like screw-shaped, powered rotating feeders 110, 112 which gather, feed, and mix the respective oil-containing polyolefin solids 119, 121 and drive them along their respective feed channels 102, 104 toward the central transverse channel passage 106. As the oil-containing polyolefin particles are forced along their feed channels 102, 104 they are worked and heated to a suitable viscous fluid state in which they forced through multichannel extrusion die 108. In accordance with the methods of this invention, the fluid polyolefin materials emerge from multichannel extrusion die 108 and are cooled to form a long, solid, two-layer or three-layer membrane having a thickness of up to about five hundred micrometers and a predetermined width for further processing and separation into separator membranes for lithium-ion cells and batteries. A co-extruded two layer film would consist of a layer of an oil-containing, cross-linkable polyolefin and a layer of oil-containing, UHMWPE.

After suitable cooling, the extruded three-layer film is physically machine-stretched along a stretch axis for purposes of initiating pore formation, enlarging the pores and interconnecting the pores in the membrane, and increasing the mechanical strength of the layered membrane in the stretched direction. Other benefits may also be obtained from the stretching of the precursor membrane for the electrochemical cell separators. The extruded, layered membrane may be cut into sections for stretching. Commercial stretching machines are available for this purpose, and they may be employed to carefully stretch the membrane along its longitudinal axis (extrusion direction or machine direction) and/or in the direction transverse to the longitudinal axis.

Either before or after such a stretching operation on the separator membrane, sections of the membrane may be soaked in or treated with a suitable organic solvent, such as methylene chloride, to extract the plasticizer oil from each of the polyolefin layers of the membrane. The removal of the oil by this "wet process" leaves a microporous open-pore structure through the layers of the separator membrane. A suitable quantity of oil is mixed with each polymer and a predetermined degree of stretching is applied to the layered membrane to yield a micropore volume of 20% to 70% of the superficial outer three dimensional volume of the separator membrane. Such a micropore volume permits infiltration of the separator membrane with a liquid, lithium-ion containing electrolyte for transport of lithium ions between opposing electrodes in a battery of lithium-ion cells. A pore volume of about 30% to about 60% is preferred in many separator embodiments.

After the separator membrane has been stretched and its micropore structure formed, the cross-linkable polyethylene or cross-linkable polypropylene layer is treated with liquid water or water vapor at a temperature suitable to initiate and complete cross-linking of the silane-grafted polyolefin. After the cross-linking reaction is completed the separator membrane is ready for cutting into a suitable shape or for other preparation for placement with the electrodes and other elements of an electrochemical cell in which it is to be used.

In general, the finished layered separator membrane displays a tensile strength of greater than 80 MPa in the stretched direction and a shrinkage amount of less than 5% when heated at 120° C. for one hour.

Multi-layer, polyolefin-based separators prepared as described above in this specification may be used in a wide variety of lithium-ion battery configurations and other electrochemical cells.

Figure 3:
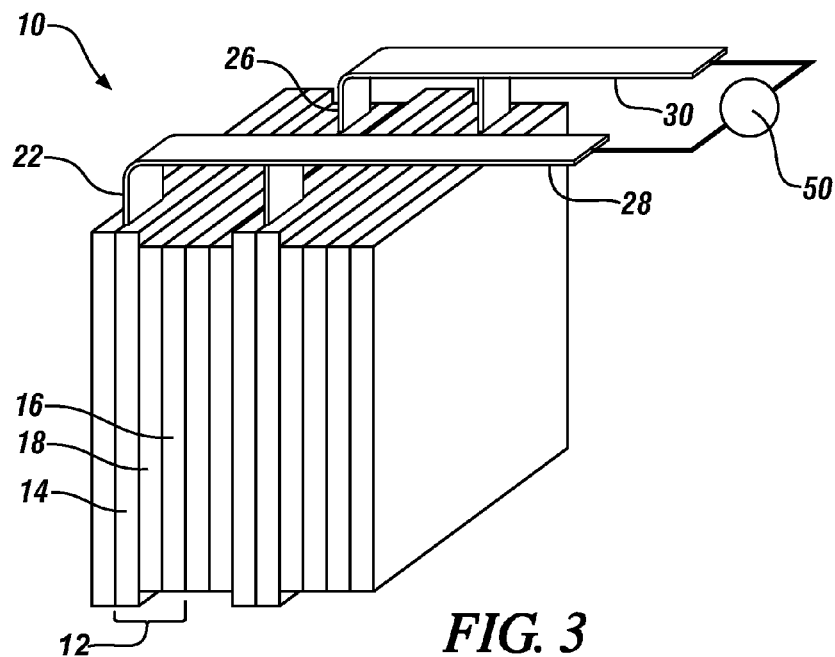
FIG. 3 is a schematic, generally side-elevation view of an interconnected group (or module) of lithium-ion electrochemical cells for a lithium-ion battery that includes a negative electrode, a positive electrode, and a porous separator membrane which is a co-extruded, micro-porous, three-layer polyolefin-based separator membrane in accordance with this disclosure. The electrodes are each associated with a compatible metallic current collector.

An exemplary and generalized illustration of a lithium ion battery 10 is depicted in FIG. 3. The lithium ion battery 10 shown here includes several rectangular-shaped electrochemical battery cells 12 that are each bracketed by metallic current collectors. The electrochemical battery cells 12 are stacked side-by-side in a modular configuration and connected in parallel (although a series connection is also permitted). The lithium ion battery (or cell groups) 10 can be connected serially or in parallel to other similarly constructed lithium ion batteries to form a lithium ion battery pack that exhibits the voltage and current capacity demanded for a particular application. It should be understood the lithium ion battery 10 shown here is only a schematic illustration. FIG. 3 is meant to show the relative position and physical interactions of the various components that constitute the electrochemical battery cells 12 (i.e., the electrodes and the separator); it is not intended to inform the relative sizes of the electrochemical battery cells' components, to define the number of electrochemical battery cells 12 in the lithium ion battery 10, or to limit the wide variety of structural configurations the lithium ion battery 10 may assume. Various structural modifications to the lithium ion battery 10 shown in FIG. 3 are possible despite what is explicitly illustrated.

The electrochemical battery cell 12 contained in the lithium ion battery 10 includes a negative electrode 14, a positive electrode 16, and the separator 18 situated between the two electrodes 14, 16. Each of the negative electrode 14, the positive electrode 16, and the separator 18 is wetted with a liquid electrolyte solution that is able to communicate lithium ions. A negative-side metallic current collector 20 that includes a negative polarity tab 22 is located between the negative electrodes 14 of adjacent electrochemical cells 12. Likewise, a positive-side metallic current collector 24 that includes a positive polarity tab 26 is located between neighboring positive electrodes 16. The negative polarity tab 22 is electrically coupled to a negative terminal 28 and the positive polarity tab 26 is electrically coupled to a positive terminal 30. An applied compressive force usually presses the metallic current collectors 20, 24, against the electrodes 14, 16 and the electrodes 14, 16 against the separator 18 to achieve intimate interfacial contact between adjacent contacting components.

Figure 4:
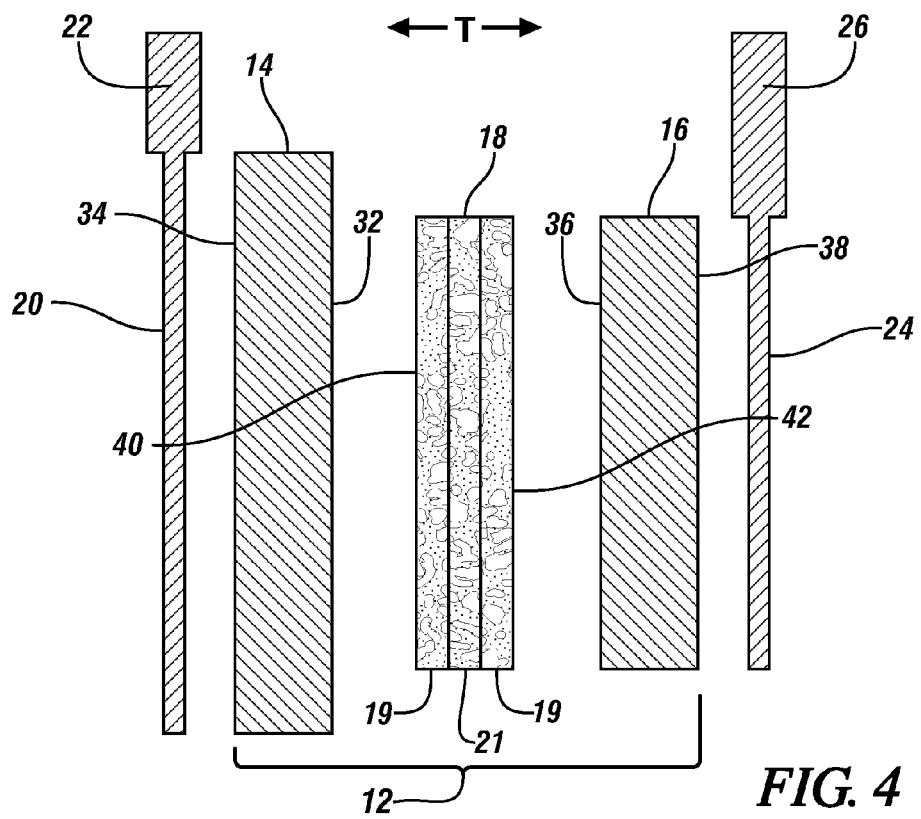
FIG. 4 is an exploded cross-sectional view of one of the electrochemical battery cells shown in FIG. 3 along with its associated metallic current collectors. The components are idealized representations that are not necessarily drawn to scale.

An exploded, enlarged, cross-sectional view of an electrochemical battery cell 12 of FIG. 3 and its associated metallic current collectors 20, 24 is generally illustrated in FIG. 4. The capital letter T, with the outwardly extended arrows, indicates the direction of the thicknesses of the members of the cell 12.

The negative electrode 14 includes an inner face surface 32 and an outer face surface 34 relative to the location of the separator 18. Of course, separator 18 may be formed of a two-layer or three layer, micro-porous polyolefin membrane as disclosed in this specification. In FIG. 4, separator 18 has outer layers 19 of cross-linked polyolefin and a middle layer 21 of UHMWPE. The positive electrode 16 similarly includes an inner face surface 36 (with respect to separator 18) and an outer face surface 38. The inner face surface 32 of the negative electrode 14 may, but is not required to, encompass a larger two-dimensional surface area than the inner face surface 36 of the positive electrode 16, as shown. When assembled into the electrochemical battery cell 12, the inner face surfaces 32, 36 of the negative and positive electrodes 14, 16 confront one another and are pressed against a negative-side major face surface 40 (on one cross-linked polyolefin layer 19) and a positive-side major face surface 42 (on the other cross-linked polyolefin layer 19) of the separator 18, respectively. Such pressed-engagement occurs generally uniformly along the entire interface of the major face surfaces 40, 42 of the separator 18 and the corresponding portions of the inner face surfaces 32, 36 of the electrodes 14, 16. The negative-side metallic current collector 20 is formed against the outer face surface 34 of the negative electrode 14 and the positive-side metallic current collector 24 is formed against the outer face surface 38 of the positive electrode 16. Both of the metallic current collectors 20, 24 engage their respective electrode outer face surfaces 34, 38 over an appreciable interfacial surface area to facilitate the efficient collection and distribution of free electrons.

The electrochemical cell 12 is generally thin and flexible. A typical thickness of the electrochemical cell 12 extending from the outer face surface 34 of the negative electrode 12 to the outer face surface 38 of the positive electrode 16 is about 80 µm to about 350 µm. Each electrode 14, 16 is preferably about 30 µm to 150 µm thick and, as already mentioned, the separator 18 is about 20 µm to 50 µm thick. The metallic current collectors 20, 24 are normally about 5 μm to 20 μm thick. The relatively thin and flexible nature of the electrochemical cell 12 and its associated metallic current collectors 20, 24 allows them to be rolled, folded, bent, or otherwise maneuvered into a variety of lithium ion battery configurations depending on design specifications and spatial constraints. The lithium ion battery 10 may, for example, include a number of distinct electrochemical cells 12 that have been fabricated, cut, aligned, and laid-up next to one another or, in an alternative embodiment, the cells 12 may be derived from a continuous layer that is folded back-and-forth over itself many times.

The negative electrode 14 includes a lithium host material that stores lithium at a relatively low electrochemical potential (relative to a lithium metal reference electrode) such as, for example, graphite or lithium titanate. The lithium host material may be intermingled with a polymeric binder material to provide the negative electrode 14 with structural integrity. The lithium host material is preferably graphite and the polymeric binder material is preferably one or more of polyvinyldiene fluoride (PVdF), an ethylene propylene diene monomer (EPDM) rubber, or a carboxymethoxy cellulose (CMC). Graphite is normally used to make the negative electrode 14 because, on top of being relatively inert, its layered structure exhibits favorable lithium intercalation and de-intercalation characteristics which help provide the electrochemical battery cell 12 with a suitable energy density. Commercial forms of graphite that may be used to construct the negative electrode 14 are available from Timcal Graphite and Carbon (headquartered in Bodio, Switzerland), Lonza Group (headquartered in Basel, Switzerland), and Superior Graphite (headquartered in Chicago, Ill.). The negative-side metallic current collector 20 associated with the negative electrode 14 is preferably a thin-film copper foil that coextensively contacts the outer face surface 34 of the negative electrode 14.

The positive electrode 16 includes a lithium-based active material that stores lithium at a higher electrochemical potential than the lithium host material used to make the negative electrode 14 (also relative to a lithium metal reference electrode). The same polymeric binder materials that may be used to construct the negative electrode 14 (PVdF, EPDM, CMC) may also be intermingled with the lithium-based active material to provide the positive electrode 16 with structural integrity. The lithium-based active material is preferably a layered lithium transition metal oxide, such as lithium cobalt oxide ($LiCoO_2$), a spinel lithium transition metal oxide, such as spinel lithium manganese oxide ($LiMn_XO_Y$), a lithium polyanion, such as a nickel-manganese-cobalt oxide [$Li(Ni_XMn_Y Co_Z)O_2$], lithium iron phosphate ($LiFePO_4$), or lithium fluorophosphate ($Li_2FePO_4F$), or a mixture of any of these materials. Some other suitable lithium-based active materials that may be employed as all or part of the lithium-based active material include lithium nickel oxide ($LiNiO_2$), lithium aluminum manganese oxide ($Li_XAl_YMn_{1-Y}O_2$), and lithium vanadium oxide ($LiV_2O_5$), to name but a few alternatives. The positive-side metallic current collector 24 associated with the positive electrode 16 is preferably a thin-film aluminum foil that coextensively contacts the outer face surface 38 of the positive electrode 16.

The multi-layer polyolefin separator 18, as disclosed in this specification, functions as a thin and electrically insulative mechanical barrier layer that physically separates the confronting inner face surfaces 32, 36 of the electrodes 14, 16 to prevent a short-circuit in the electrochemical battery cell 12. The separator 18 is also sufficiently porous to permit infiltration of the liquid electrolyte solution and the internal passage of dissolved lithium ions. Should the battery cell 12 experience a rise in temperature that reaches 100° C. the separator 18 will keep the electrodes 14, 16 separated. The ability of the separator 18 to withstand such potential spikes in temperature provides the electrochemical battery cell 12 with durability and helps prevent short-circuit events that may cause the cell 12 to lose capacity or fail altogether. In the event the electrochemical cell 12 reaches a temperature of about 130° C., the UHMWPE layer will likely melt and prevent further lithium-ion transport between the electrodes 14, 16. This melting of the UHMWPE layer provides a thermal-shutdown of the cell while the un-melted, cross-linked polyolefin layers retain physical separation of the electrodes 14, 16. In contrast, a conventional polyethylene or polypropylene separator will likely melt or shrink at a temperature well below 130° C. and permit an electrical short between the electrodes.

The liquid electrolyte solution infiltrated into the separator 18, and which wets both electrodes 14, 16, is preferably a lithium salt dissolved in a non-aqueous solvent. Some suitable lithium salts that may be used to make the liquid electrolyte solution include $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiPF_6$, and a mixture that includes one or more of these salts. The non-aqueous solvent in which the lithium salt is dissolved may be a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture that includes one or more of these solvents.

Referring back to FIG. 3, the negative and positive terminals 28, 30 of the lithium ion battery 10 may be connected to an electrical device 50 that generally encompasses power-consuming and power-generating devices. A power-consuming device is one that is powered fully or partially by the lithium ion battery 10 when operating in a discharge state. Conversely, a power-generating device is one that charges or re-powers the lithium ion battery 10. The power-consuming device and the power-generating device can be the same device in some instances. For example, the electrical device 50 may be an electric motor for a hybrid electric or an extended range electric vehicle that is designed to draw an electric current from the lithium ion battery 10 during acceleration and provide a regenerative electric current to the lithium ion battery 10 during deceleration. The power-consuming device and the power-generating device can also be different devices. For example, the power-consuming device may be an electric motor for a hybrid electric or an extended range electric vehicle and the power-generating device may be an AC wall outlet, an internal combustion engine, and/or a vehicle alternator.

The lithium ion battery 10 can provide a useful electrical current to the electrical device 50 by way of reversible electrochemical reactions that occur in the electrochemical battery cell 12 when a closed-circuit connects the negative terminal 28 and the positive terminal 30 at a time when the negative electrode 14 contains a sufficient quantity of intercalated lithium (i.e., battery discharge). The electrochemical potential difference between the negative electrode 14 and the positive electrode 16—approximately 2.5 to 4.3V depending on the composition of the electrodes 14, 16—drives the oxidation of intercalated lithium contained in the negative electrode 14. Free electrons produced by this oxidation reaction are collected by the negative-side current collector 20 and supplied to the negative terminal 28. A flow of free electrons is harnessed and directed through the electrical device 50 from the negative terminal 28 to the positive terminal 30 and eventually to the positive electrode 16 by way of the positive-side current collector 24. Lithium ions, which are also produced at the negative electrode 14, are concurrently carried through the separator 18, more specifically through the tortuous and interconnected network of pores defined in the polymer material matrix, by the liquid electrolyte solution in route to the positive electrode 16. The flow of free electrons through the electrical device 50 from the negative terminal 28 to the positive terminal 30 can be continuously or intermittently provided until the negative electrode 14 is depleted of intercalated lithium and the capacity of the electrochemical battery cell 12 is spent.

The lithium ion battery 10 can be charged or re-powered at any time by applying an external voltage originating from the electrical device 50 to the electrochemical battery cell 12 to reverse the electrochemical reactions that occur during discharge. The applied external voltage compels the otherwise non-spontaneous oxidation of intercalated lithium contained in the positive electrode 16 to produce free electrons and lithium ions. The free electrons are collected by the positive-side current collector 24 and supplied to the positive terminal 30. A flow of the free electrons is directed to the negative terminal 28 and eventually to the negative electrode 14 by way of the negative-side current collector 20. The lithium ions are concurrently carried back through the separator 18 in the liquid electrolyte solution towards the negative electrode 14. The lithium ions and the free electrons eventually reunite and replenish the negative electrode 14 with intercalated lithium to prepare the electrochemical battery cell 12 for another discharge phase.

While practices and embodiments of the invention have been illustrated by exemplary examples, the use of specific examples is not intended to limit the scope of the claimed invention.

The invention claimed is:

1. A method of making a separator for a lithium-ion electrochemical cell, the method comprising:
   co-extruding (i) a melt of a water-curable cross-linkable polyolefin mixed with a hydrocarbon plasticizer oil and (ii) a melt of ultrahigh molecular weight polyethylene mixed with a hydrocarbon plasticizer oil to form either a two-layer structure of co-extensive films of the cross-linkable polyolefin and the ultrahigh molecular weight polyethylene or a three-layer structure of two outer layers of cross-linkable polyolefin and a central layer of ultrahigh molecular weight polyethylene, the extrudate having a shape and area for obtaining one or more separator membranes for a lithium-ion electrochemical cell;
   cooling the co-extruded layers to form a solid layered structure up to about five hundred micrometers in thickness;
   stretching the solid layered structure and extracting the hydrocarbon plasticizer oil from the solid layered structure to form a separator membrane structure having a pore volume that is 20% to 70% of the outline volume of the separator structure, the separator membrane structure having a thickness of up to 50 micrometers; and
   reacting the cross-linkable polyolefin with water or water vapor to cure the cross-linkable polyolefin and form a layered separator structure comprising co-extensive films of the cross-linked polyolefin and the ultrahigh molecular weight polyethylene.

2. A method of making a separator for a lithium-ion electrochemical cell as stated in claim 1 in which the cross-linked polyolefin of the separator is formed from a water curable polyethylene, a water-curable polypropylene, or a water-curable copolymer of ethylene and propylene.

3. A method of making a separator for a lithium-ion electrochemical cell as stated in claim 1 in which the cross-linkable polyolefin of the separator is mixed with a copolymer of ethylene and vinyl acetate or with polyacrylic acid-grafted polyethylene in an amount up to about one-hundred weight percent of the cross linked cross-linkable polyolefin.

4. A method of making a separator for a lithium-ion electrochemical cell as recited in claim 1 in which the cross-linked polyolefin of the separator is a water-cured, silane-grafted polyethylene.

5. A method of making a separator for a lithium-ion electrochemical cell as recited in claim 1 in which the cross-linked polyolefin of the separator is a water-cured, silane-grafted polypropylene.

6. A method of making a separator for a lithium-ion electrochemical cell as recited in claim 1 in which the cross-linked polyolefin of the separator is a water-cured, silane-grafted copolymer of ethylene and propylene.

7. A method of making a separator for a lithium-ion electrochemical cell as stated in claim 1 in which the cross-linked polyolefin of the separator is formed from a water curable polyethylene.

* * * * *